US012585866B2

(12) United States Patent
Pflaum et al.

(10) Patent No.: US 12,585,866 B2
(45) Date of Patent: Mar. 24, 2026

(54) AUTOMATED ENTRY OF EXTRACTED DATA AND VERIFICATION OF ACCURACY OF ENTERED DATA THROUGH A GRAPHICAL USER INTERFACE

(71) Applicant: INTUIT INC., Mountain View, CA (US)

(72) Inventors: Lana Grace Pflaum, Oceanside, CA (US); Kenichi Mori, Carlsbad, CA (US); Michael A. Artamonov, San Diego, CA (US); Craig Moll, Eagan, MN (US)

(73) Assignee: INTUIT INC., Mountain View, CA (US)

( * ) Notice: Subject to any disclaimer, the term of this patent is extended or adjusted under 35 U.S.C. 154(b) by 127 days.

(21) Appl. No.: 18/240,815

(22) Filed: Aug. 31, 2023

(65) Prior Publication Data

US 2025/0077766 A1     Mar. 6, 2025

(51) Int. Cl.
*G06F 40/174* (2020.01)
*G06F 3/0481* (2022.01)

(52) U.S. Cl.
CPC .......... *G06F 40/174* (2020.01); *G06F 3/0481* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 6,647,156 | B1 * | 11/2003 | Meding ................. | G06F 40/174 |
| | | | | 707/E17.063 |
| 9,430,453 | B1 * | 8/2016 | Ho ......................... | G06F 40/226 |
| 10,379,699 | B2 * | 8/2019 | Toyoda ............... | G06F 3/04817 |
| 2006/0155670 | A1 * | 7/2006 | Forlenza ................. | G06F 9/451 |
| 2010/0161460 | A1 * | 6/2010 | Vroom ................... | G06Q 40/02 |
| | | | | 715/764 |

(Continued)

OTHER PUBLICATIONS

Itani, Mahmoud, "How to download Steam games on a Mac", published Oct. 18, 2021, archived May 25, 2022, XDA-Developers, <URL: https://web.archive.org/web/20220525173149/https://www.xda-developers.com/how-to-download-steam-games-on-a-mac/>, retrieved Apr. 11, 2025 (Year: 2021).*

*Primary Examiner* — Christopher J Fibbi
(74) *Attorney, Agent, or Firm* — Patterson + Sheridan, LLP

(57) ABSTRACT
A method for automatically populating a document being prepared via a software application based on extracted data from one or more of a plurality of different source documents may include displaying a graphical user interface associated with the software application and include a first area configured to display data associated with the document and a second area displaying a queue including at least a first graphical object descriptive of a first source document of the plurality of source documents. The method includes automatically populating one or more data fields of the document that are displayed within the first area of the graphical user interface with the extracted data from the first source document. In response to the automatically populating, the method includes automatically updating the second area of the graphical user interface to reflect the data fields have been auto populated with the extracted data from the first source document.

11 Claims, 6 Drawing Sheets

(56)          References Cited

U.S. PATENT DOCUMENTS

| | | | |
|---|---|---|---|
| 2011/0320925 A1* | 12/2011 | Piersol | G06F 40/174 |
| | | | 715/231 |
| 2019/0205400 A1* | 7/2019 | Puzicha | H04L 51/18 |
| 2022/0137886 A1* | 5/2022 | Nozawa | G06F 3/1221 |
| | | | 358/1.15 |
| 2022/0398273 A1* | 12/2022 | Dearing | G06F 40/30 |
| 2024/0111944 A1* | 4/2024 | Pol | G06F 40/169 |
| 2024/0338521 A1* | 10/2024 | Gdak | G06F 40/226 |

* cited by examiner

500

502

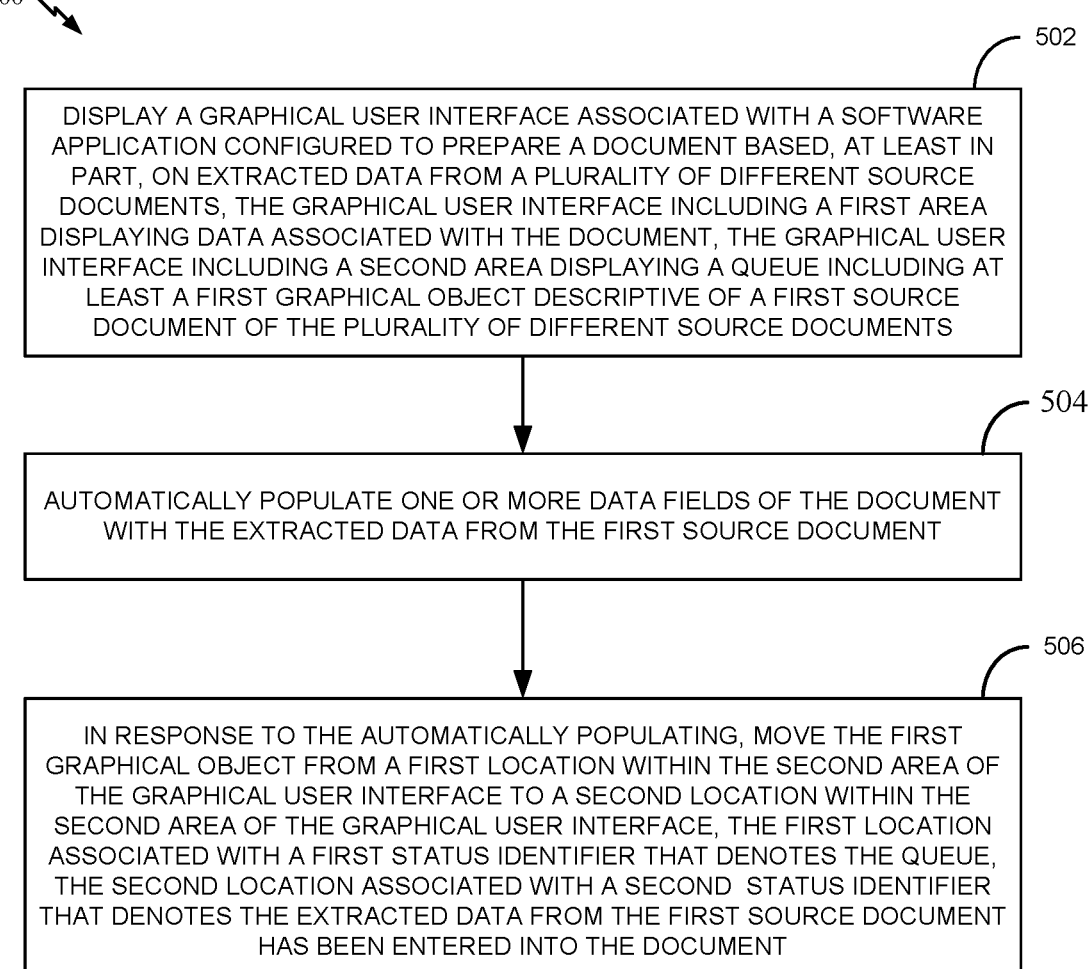

DISPLAY A GRAPHICAL USER INTERFACE ASSOCIATED WITH A SOFTWARE APPLICATION CONFIGURED TO PREPARE A DOCUMENT BASED, AT LEAST IN PART, ON EXTRACTED DATA FROM A PLURALITY OF DIFFERENT SOURCE DOCUMENTS, THE GRAPHICAL USER INTERFACE INCLUDING A FIRST AREA DISPLAYING DATA ASSOCIATED WITH THE DOCUMENT, THE GRAPHICAL USER INTERFACE INCLUDING A SECOND AREA DISPLAYING A QUEUE INCLUDING AT LEAST A FIRST GRAPHICAL OBJECT DESCRIPTIVE OF A FIRST SOURCE DOCUMENT OF THE PLURALITY OF DIFFERENT SOURCE DOCUMENTS

504

AUTOMATICALLY POPULATE ONE OR MORE DATA FIELDS OF THE DOCUMENT WITH THE EXTRACTED DATA FROM THE FIRST SOURCE DOCUMENT

506

IN RESPONSE TO THE AUTOMATICALLY POPULATING, MOVE THE FIRST GRAPHICAL OBJECT FROM A FIRST LOCATION WITHIN THE SECOND AREA OF THE GRAPHICAL USER INTERFACE TO A SECOND LOCATION WITHIN THE SECOND AREA OF THE GRAPHICAL USER INTERFACE, THE FIRST LOCATION ASSOCIATED WITH A FIRST STATUS IDENTIFIER THAT DENOTES THE QUEUE, THE SECOND LOCATION ASSOCIATED WITH A SECOND  STATUS IDENTIFIER THAT DENOTES THE EXTRACTED DATA FROM THE FIRST SOURCE DOCUMENT HAS BEEN ENTERED INTO THE DOCUMENT

FIG. 5

AUTOMATED ENTRY OF EXTRACTED DATA AND VERIFICATION OF ACCURACY OF ENTERED DATA THROUGH A GRAPHICAL USER INTERFACE

INTRODUCTION

Aspects of the present disclosure relate to graphical user interfaces for verifying automated entry of extracted data from a plurality of different sources into a document being prepared with a software application. In particular, techniques described herein include providing a graphical user interface that allows a user to determine a status (e.g., ready to be entered, entered, entered and verified) for each of the different sources.

BACKGROUND

Every year millions of people, businesses, and organizations around the world utilize software applications to assist with countless aspects of life. In some cases, a software application may be used to prepare a document, such as a tax return, that may include a plurality of different topics. For each of the different topics, the document may include one or more fields that need to be populated with data from a different source document. For example, a first topic of the document may include one or more fields that need to be populated with data from a first source document (e.g., W-2 form), whereas a second topic of the document may include one or more fields that need to be populated with data from a second source document (e.g., 1099 form).

However, since the different source documents lack connectivity to the different topics in the document, the user must manually enter data from the different sources into the respective topic of the document. Given that the document may include a large number of topics, requiring the user to manually enter data from the different sources into the respective topic of the document can be burdensome. Also, the user may enter data incorrectly for one or more topics of the document.

Accordingly, there is a need for improved graphical user interfaces that allow a user to efficiently auto populate a document with extracted data from a plurality of different source documents and verify the accuracy of the auto populated document.

BRIEF SUMMARY

In one aspect, a method is provided. The method includes displaying a graphical user interface associated with a software application configured to prepare a document based, at least in part, on extracted data from one or more of a plurality of different source documents. The graphical user interface includes a first area displaying data associated with the document and a second area displaying a queue including at least a first graphical object descriptive of a first source document of the plurality of source documents. The method includes automatically populating one or more data fields of the document with the extracted data from the first source document. In response to the automatically populating, the method includes moving the first graphical object from a first region within the second area of the graphical user interface to a second region within the second area of the graphical user interface. The first region is associated with a first status identifier that denotes the queue and the second region associated with a second status identifier that denotes the extracted data from the first source document has been entered into the document.

In another aspect, a non-transitory computer-readable storage medium is provided that stores instructions that, when executed by a computer system, cause the computer system to perform the method set forth above. In yet another aspect, a system is provided that includes at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 5 depicts example operations related to automated entry of extracted data and verification of accuracy of the entered data according to some embodiments of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
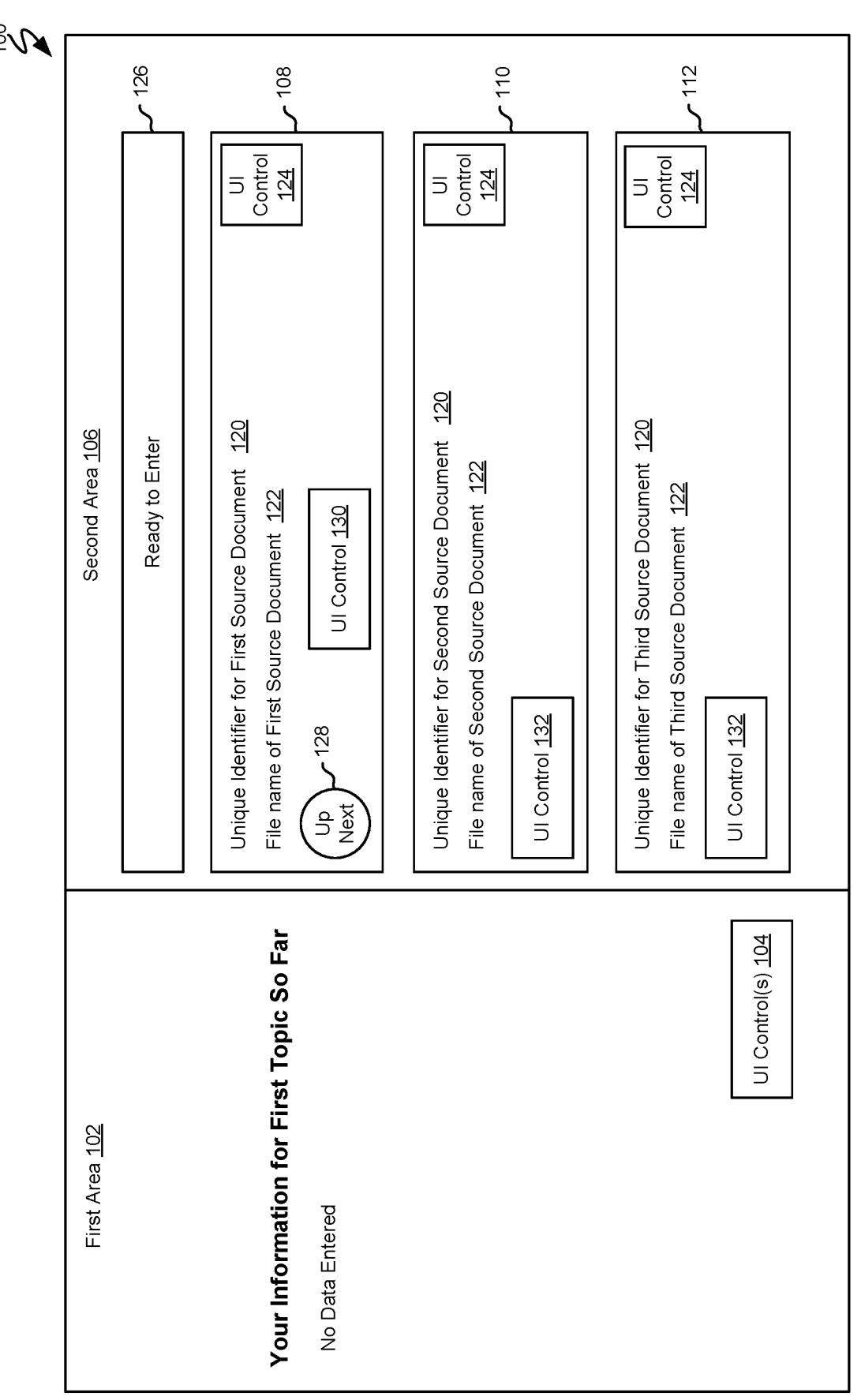
FIG. 1 depicts an example user interface screen related to automated entry of extracted data and verification of accuracy of the entered data according to some embodiments of the present disclosure.

Aspects of the present disclosure provide apparatuses, methods, processing systems, and computer readable mediums for displaying a graphical user interface that allows a user to auto populate a document (e.g., tax return) with extracted data from a plurality of different source documents (e.g., tax forms) and verify the accuracy of the auto populated document.

The graphical user interface may be displayed on a screen of an electronic device (e.g., laptop, tablet, etc.) and may include a first area that displays data associated with the document and a second area that is adjacent (e.g., immediately next to) the first area and displays a queue including one or more graphical objects that are descriptive of source documents that are ready to be entered into the document being prepared via the software application. In some embodiments, the graphical user interface may be displayed in a tab of an internet browser. In alternative embodiments, the graphical user interface may be displayed in a window associated with an operating system installed on the electronic device. Details of the graphical user interface will now be discussed in more detail.

The queue included in the second area of the graphical user interface may include at least a first graphical object that is descriptive of a first source document having extracted data that is ready to be entered into the document being prepared via the software application. In some embodiments, the first graphical object may include a unique identifier to distinguish the first source document from other source documents included in the queue. Alternatively, or additionally, the first graphical object may include a file name of the first source document. In some embodiments, the first graphical object may include one or more user interface (UI) controls that, when selected (e.g., clicked) by a user interacting with the graphical user interface, may prompt the software application to perform one or more actions. For instance, in some embodiments, the action may include opening the first source document in a separate tab or window.

The software application may be configured to auto populate one or more data fields of the document with the extracted data from the first source document. Once the document is auto populated with the extracted data from the first source document, the software application may automatically update the second area of the graphical user interface to reflect that the one or more data fields have been auto populated with the extracted data from the first source document.

In some embodiments, automatically updating the second area of the graphical user interface may include moving the first graphical object within the second area of the graphical user interface. For instance, the software application may be configured to move the first graphical object from a first region associated with a first status identifier denoting the queue of source documents ready to be entered into the document to a second region associated with a second status identifier denoting one or more source documents that have been entered into the document. In this manner, the graphical user interface, specifically the second area thereof, can automatically organize the source documents depending on whether they have or have not been entered into the document being prepared via the software application.

The software application may allow the user to verify the accuracy of the data fields of the document that were auto populated with the extracted data from the first source document. For instance, the first graphical object may, as discussed above, include a UI control that, when selected (e.g., clicked) by the user, opens the first source document in a tab or window that is separate from the tab or window in which the graphical user interface is being displayed. In this manner, the user can manually compare the auto populated data in the document against the corresponding data in the first source document to ensure no errors occurred when auto populating the one or more data fields with the extracted data from the first source document. Furthermore, if one or more of the data fields of the document were not auto populated with (e.g., left blank) extracted data from the first source document, the user may, at this time, manually enter the corresponding data from the first source document into the one or more data fields.

In some embodiments, the first source document displayed in the separate tab or window may include a drop-down menu that includes different statuses (e.g., Not Entered, Entered, Entered and Verified) for the first source document. When the user confirms the accuracy of the auto populated data fields of the document, the user can change the status of the first source document in the drop-down menu from a first status (e.g., Entered) to a second status (e.g., Entered and Verified). Additionally, the user changing the status of the first document to the second status can prompt the software application to automatically update the second area of the graphical user interface to indicate the status change of the first source document. For instance, in some embodiments, the status identifier for the second region of the second area of the graphical user interface may be modified to reflect the change in status for the first source document. For example, text for the second status identifier may be changed from "Entered" to "Entered and Verified" to reflect that the first source document is now verified. In alternative embodiments, automatically updating the second area of the graphical user interface to indicate the status change of the first source document may include moving the first graphical object to a different region (e.g., a third region) of the second area of the graphical user interface in response to the user changing the status of the first source document after verifying the accuracy of the document that was auto populated with extracted data from the first source document. More specifically, the different region (e.g., third region) may be associated with a third status identifier titled "Entered and Verified".

It should be understood that the above process may be performed iteratively until the queue has been cleared (that is, there are no graphical objects still in the first region of the second area of the graphical user interface). For example, the process described above with respect to the first graphical object may be repeated for a second graphical object in the queue and so on until the queue is cleared.

In some embodiments, a source document may have a particular structure for a one or more reasons (e.g., government requirements). However, the process of auto populating the document (e.g., data fields thereof) being prepared via the software application with the extracted data from the source document may be unaffected by the particular structure of the source document. More specifically, the software application will not have to be configured to accommodate the particular structure of the source document.

In some embodiments, the user of the software application may opt to modify the order of the respective topics of the document being prepared via the software application. In such embodiments, the queue of documents would be unaffected by the modification to the order of the respective documents. For instance, if the user opted to modify the order of the respective topics so that a second topic of the document was auto populated before the first topic of the document, the queue of source documents would be unaffected because the software application may be configured to automatically select the correct source document for the second topic of the document regardless of where the correct document is within the queue. Stated another way, the software application does not require pre-defined rules for the queue that are based, at least in part, on the order of the respective topics of the document being prepared via the software application. Instead, the software application may be configured to select a source document from the queue having extracted data that corresponds to the data fields (e.g., respective topic) that is currently displayed within the first area of the graphical user interface.

Software applications having graphical user interfaces according to embodiments of the present disclosure provide numerous benefits. For example, auto populating the document with the extracted data for the source documents eliminates the need for the extracted data to be manually entered by a user. Furthermore, the second area of the graphical user interface that updates in real-time to reflect changes to the status of the source documents being processed allows the user to stay apprised of which source documents have not been entered yet, which source documents have been entered but not verified by the user, and which source documents have been entered and verified by the user. Still further, since the second area is adjacent (e.g., immediately next to) to the first area of the graphical user interface in which the user prepares the document (that is, corrects incorrectly populated data fields) the user does not need to open additional windows or tabs to view the status of all the different source documents, which reduces the amount of screen space the graphical user interface occupies and therefore utilizes computing resources in a more efficient manner.

Example Graphical User Interface Screen for Automatically Populating Data Fields of a Document with Extracted Data from One or More Source Documents FIG. 1 depicts a graphical user interface 100 associated with a software application for preparing a document (e.g., tax return) having a plurality of different topics (e.g., W-2s, 1099s, etc.) according to some embodiments of the present disclosure. In some embodiments, the user may access the software application via an internet browser. In such embodiments, the graphical user interface 100 may be displayed within the same tab or window of the internet browser. In alternative embodiments, the software application may be executed locally by a computing device. In such embodiments, the graphical user interface 100 may be displayed within a single window associated with the software application. Details of the graphical user interface 100 will now be discussed in detail.

The graphical user interface 100 may include a first area 102 (e.g., workspace area) having a UI control 104 that allows a user (e.g., tax expert) to navigate to each of the different topics of the document. More specifically, the UI control 104 may be a graphical user interface button that the user may select (e.g., click) to navigate to a respective topic of the document. Furthermore, the first area 102 may indicate what, if any, information has been entered for a respective topic of the document. The first area 102 of the document may also display different data fields associated with each respective topic of the document that, as will be discussed later on in more detail, need to be populated with data extracted from one or more of a plurality of different source documents (e.g., W-2s, 1099s, etc.).

The graphical user interface 100 may also include a second area 106 (e.g., status area) that is positioned adjacent (e.g., immediately next to) the first area 102 of the graphical user interface 100. The second area 106 of the graphical user interface 100 may include a queue of a plurality of different source documents associated with a respective topic of the document being prepared via the software application. For example, if the user navigates (e.g., via the UI control 104 in the first area 102) to a first topic (e.g., W-2s) of the document, the queue may include a plurality of different source documents associated with the first topic of the document being prepared via the software application. As will be discussed in more detail with reference to FIG. 2, one or more data fields included within the first topic of the document being prepared by the software application may be auto populated with extracted data from the different source documents included in the queue. In this manner, the need for the data to be manually entered by the user for each of the different source documents included in the queue may be eliminated, which can reduce the amount of time it takes to prepare the document via the software application as compared to conventional software applications that do not provide such functionality.

In some embodiments, the queue of different source documents associated with a given topic (e.g., first topic) of the document being prepared via the software application may include a first graphical object 108 descriptive of a first source document (e.g., first W-2), a second graphical object descriptive 110 of a second source document (e.g., second W-2), and a third graphical object 112 descriptive of a third source document (e.g., third W-2). It should be understood that the queue of source documents for the given topic of the document being prepared via the software application may vary depending on the user. For example, another user that is using the software application to prepare the document may have more or fewer source documents for a respective topic of the document.

In some embodiments, each of the graphical objects 108, 110, 112 included in the queue may include a unique identifier 120. For instance, the unique identifier 120 for the first graphical object 108 may uniquely identify the first source document, the unique identifier 120 for the second graphical object 110 may uniquely identify the second source document, and the unique identifier 120 for the third graphical object 110 may uniquely identify the third source document. In some embodiments, the unique identifier 120 may be manually created by the user. In alternative embodiments, the unique identifier 120 may be automatically generated by the software application based, at least in part, on one or more attributes (e.g., file name) for the respective source document.

In some embodiments, each of the graphical objects 108, 110, 112 may include a file name 122 for the respective source document. For instance, the first graphical object 108 may include the file name 122 for the first source document, the second graphical object 110 may include the file name 122 for the second source document, and the third graphical object 112 may include the file name 122 for the third source document.

In some embodiments, each of the graphical objects 108, 110, 112 may include a first UI control 124 that allows the user to access (e.g., open) the respective source document. For instance, in some embodiments, the first UI control 124 may be a graphical user interface button that, when selected (e.g., clicked) by the user, allows the user to access (e.g., open) the respective source document. Thus, user-selection of the first UI control 124 for a respective graphical object 108, 110, 112 may cause the software application to open the respective source document. In some embodiments, the software application may open the respective source document in a different tab or window than the tab or window in which the graphical user interface 100 is displayed.

The second area 106 of the graphical user interface 100 may display a first status identifier 126 (e.g., Ready to Enter, Entered, Entered and Verified) denoting the queue of different source documents having extracted data that is ready to be entered into the document being prepared via the software application. For instance, in some embodiments, the first area 102 of the graphical user interface 100 shown in FIG. 1 may indicate that no information has been entered yet for the first topic (e.g., W-2s) of the document being prepared via the software application. In such embodiments, the first status identifier 126 displayed in the second area 106 of the graphical user interface 100 and titled "Ready to Enter" may denote that the queue currently includes the first graphical object 108, the second graphical object 110, and the third graphical object 112. As will be discussed below in more detail, the second area 106 of the graphical user interface 100 may be automatically updated (e.g., in real-time) as the document (e.g., one or more data fields thereof) are auto populated with the extracted data from each of the different source documents. For instance, in some embodiments, automatically updating the second area 106 of the graphical user interface 100 may include moving the graphical objects 108, 110, 112 to different regions within the second area 106 of the graphical user interface 100 as the respective source documents are entered into the document and/or verified by a user (e.g., expert) interacting with the graphical user interface to prepare the document via the software application.

As shown, the first graphical object 108 in the queue may, in some embodiments, include an icon 128 to indicate that the first source document is next in the list of source documents from which extracted data is to be automatically entered into one or more data fields associated with the first topic of the document being prepared via the software application. For instance, in some embodiments, the icon 128 may include text (e.g., "Next Up") to indicate that the first source document is next in the list.

In some embodiments, the graphical object (e.g., the first graphical object 108) that is up next in the queue may include a second UI control 130 that allows the user to deselect the graphical object (e.g., the first graphical object 108) from the queue so that the source document (e.g., first source document) associated with the graphical object is no longer "Up Next" in the queue. Furthermore, in some embodiments, the second graphical object 110 and the third graphical object 112 in the queue may each include a second UI control 132 that, when selected (e.g., clicked) by the user, causes the second and third source documents, respectively, to be selected for entry into the document being prepared via the software application.

Figure 2:
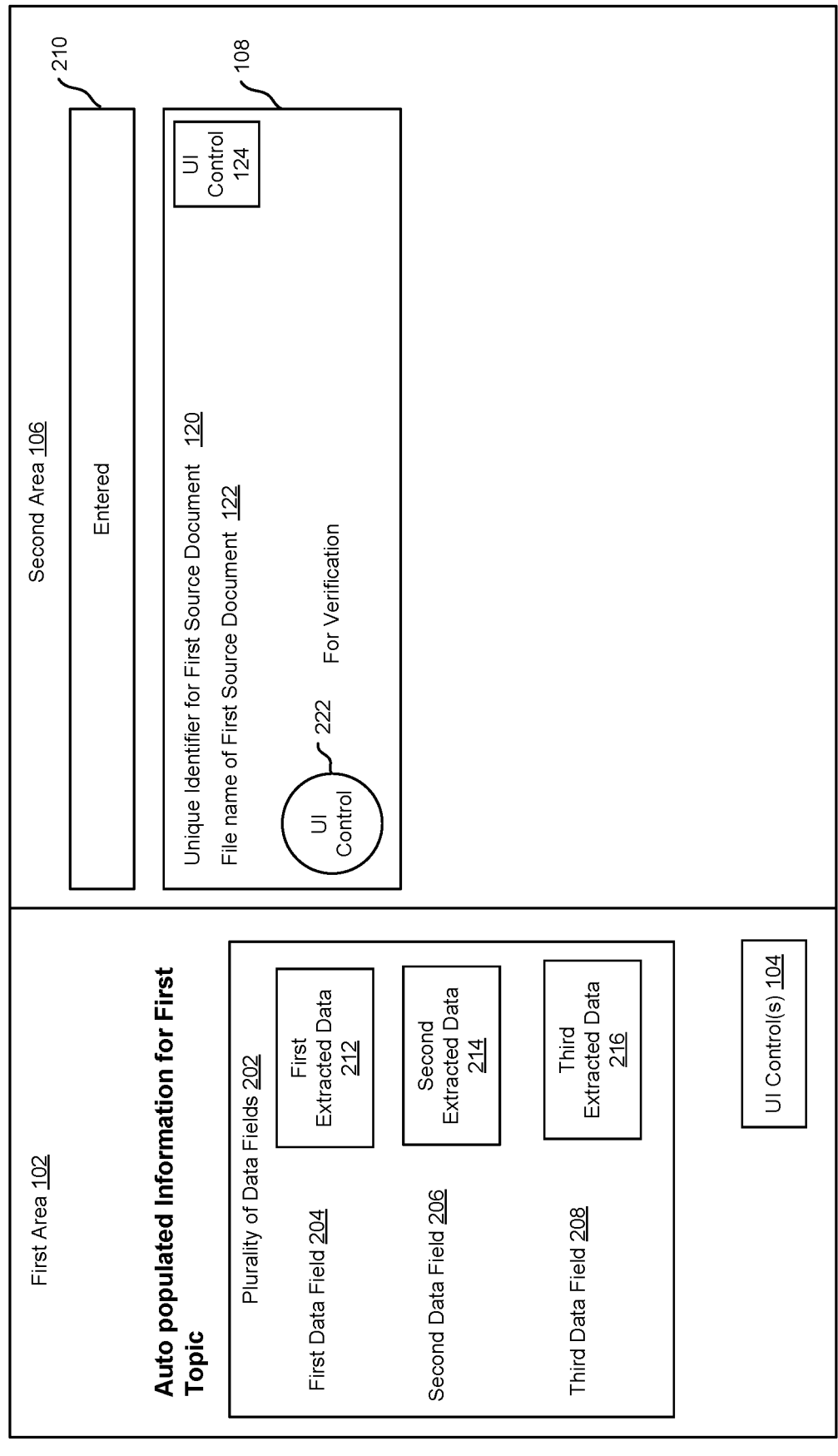
FIG. 2 depicts an example user interface screen related to automated entry of extracted data and verification of accuracy of the entered data according to some embodiments of the present disclosure

Example Graphical User Interface Screen Depicting
Auto Populated Data Fields of a Document FIG. 2 depicts a graphical user interface 200 illustrating auto population of a plurality of different data fields 202 within a first topic (e.g., W-2s) of a document (e.g., tax return) being prepared by a software application (e.g., tax preparation software) according to some embodiments of the present disclosure. As shown, the different fields 202 within the first topic of the document may be auto populated with extracted data from the first source document associated with the first graphical object 108.

The plurality of data fields 202 may include a first data field 204, a second data field 206, and a third data field 208. It should be understood that, in alternative embodiments, the first topic of the document being prepared by the software application may include more or fewer data fields than are shown in FIG. 2. For instance, in some embodiments, the first, second, and third data fields 204, 206, 208 of the first topic may be displayed on a first page, whereas additional data fields of the first topic may be displayed on a second page to which the user may navigate to by selecting (e.g., clicking) the UI control(s) 104 included in the first area 102 of the graphical user interface 100. In some embodiments, the first topic of the document may be auto populated with the extracted data from the first source document as the user navigates through the different pages of data fields included in the first topic of the document. For instance, data fields (e.g., first data field 204, second data field 206, third data field 208) included on the first page of the first topic of the document being prepared by the software application may be auto populated with the appropriate extracted data from the first source document while the user is viewing the first page of the first topic of the document. When the user navigates from the first page of the first topic of the document to the second page of the first topic of the document, data fields included on the second page will then be auto populated with the extracted data from the first source document. In this manner, the user can view the different data fields of the first topic of the document being auto populated with the extracted data from the first source document in real-time.

In alternative embodiments, the additional data fields may be included on the same page as the first, second and third data fields 204, 206, 208. For instance, the graphical user interface 200 may include a scroll bar (not shown) that allows the user to move (e.g., up or down) within the page to view the additional data fields. In such embodiments, the data fields may be auto populated with the appropriate extracted data from the first source document as the user scrolls down the page and the data fields come into view (e.g., are displayed) in the first area 102 of the graphical user interface 200.

The data fields 204, 206, 208 may correspond to different portions of the first source document. For instance, in some embodiments, the first source document may be a financial document (e.g., W-2) for an individual and may include a plurality of different fields (e.g., employee identification number, employer name, etc.) populated with information that is specific to the individual. In such embodiments, the data fields 204, 206, 208 may each correspond to a respective field in the financial document. In this manner, the data fields 204, 206, 208 included in the first topic of the document being prepared via the software application may be auto populated with extracted data from the respective field of the financial document (that is, the first source document).

In some embodiments, one or more of the data fields 204, 206, 208 may not be auto populated with extracted data from the first source document. For example, extracted data may be missing for the third data field 208 in the first topic of the document being prepared via the software application. In some embodiments, the software application may manipulate (e.g., highlight) the third data field 208 to prompt the user to check the third data field 208 against the first source document and, if needed, manually enter the requisite data for the third data field 208. In this manner, the software application can prompt user intervention when needed to ensure all the extracted data from the first source document is entered.

The second area 106 of the graphical user interface 200 may be automatically updated to reflect the plurality of data fields 202 being auto populated with the extracted data from the first source document. For instance, in some embodiments, the first graphical object 108 may be automatically moved within the second area 106 of the graphical user interface 200 to indicate that the first source document is no longer in the queue of source documents having extracted data that is ready to be entered into the document being prepared via the software application. For instance, the first graphical object 108 may be automatically moved from a first region that is associated with the first status identifier 126 (FIG. 1) denoting the queue of source documents to a second region that is associated with a second status identifier 210 titled "Entered" denoting one or more source documents whose extracted data has been entered into the document being prepared via the software application.

In some embodiments, the first graphical object 108 may be modified in one or more ways in response to the plurality of data fields 202 being auto populated with the extracted data from the first source document associated with the graphical object. For instance, in some embodiments, the first graphical object 108, specifically the second UI control 132 (shown in FIG. 1) thereof, may be automatically replaced with a third UI control 222 that, when selected (e.g., clicked) by the user, prompts the user to verify each data field 204, 206, 208 in the first topic of the document that was auto populated with extracted data 212, 214, 216 from the first source document is correct. For instance, the third UI control 222 may, when selected by the user, cause the software application to open the first source document in another window or tab that is separate from the window or tab in which the graphical user interface 200 is displayed. In this manner, the user can manually cross-check the data fields 204, 206, 208 against the first source document for errors.

In some embodiments, the window or tab in which the first source document is displayed may include a drop-down menu with a first status identifier (e.g., Entered) and a second status identifier (e.g., Entered and Verified). When the user finishes reviewing the extracted data 212, 214, 216 that the data fields 204, 206, 208 within the first topic of the document being prepared by the software application were auto populated with against the data in the first source document, the user may change a status of the first source document within the drop-down menu included in the first source document from the first status identifier (e.g., Entered) to the second status identifier (e.g., Entered and Verified).

In some embodiments, this action by the user may prompt the software application to automatically update the second area 106 of the graphical user interface 200 to reflect that the plurality of data fields 202 that were auto populated with extracted data from the first source document have been verified for accuracy by the user. For instance, in some embodiments, automatically updating the second area 106 of the graphical user interface 200 may include replacing the second status identifier 210 with a third identifier (e.g., third status identifier 402 in FIG. 4 discussed below) denoting one or more source documents whose extracted data has been entered into the document and verified by the user. In alternative embodiments in which the second region of the second area 106 of the graphical user interface 200 includes other graphical objects representative of other source documents that have been entered but not verified, automatically updating the second area 106 of the graphical user interface 200 may include automatically moving the first graphical object 108 from the second region of the second area 106 to a third region of the second area 106 that includes the third identifier denoting one or more source documents whose extracted data has been entered into the document and verified by the user.

Figure 3:
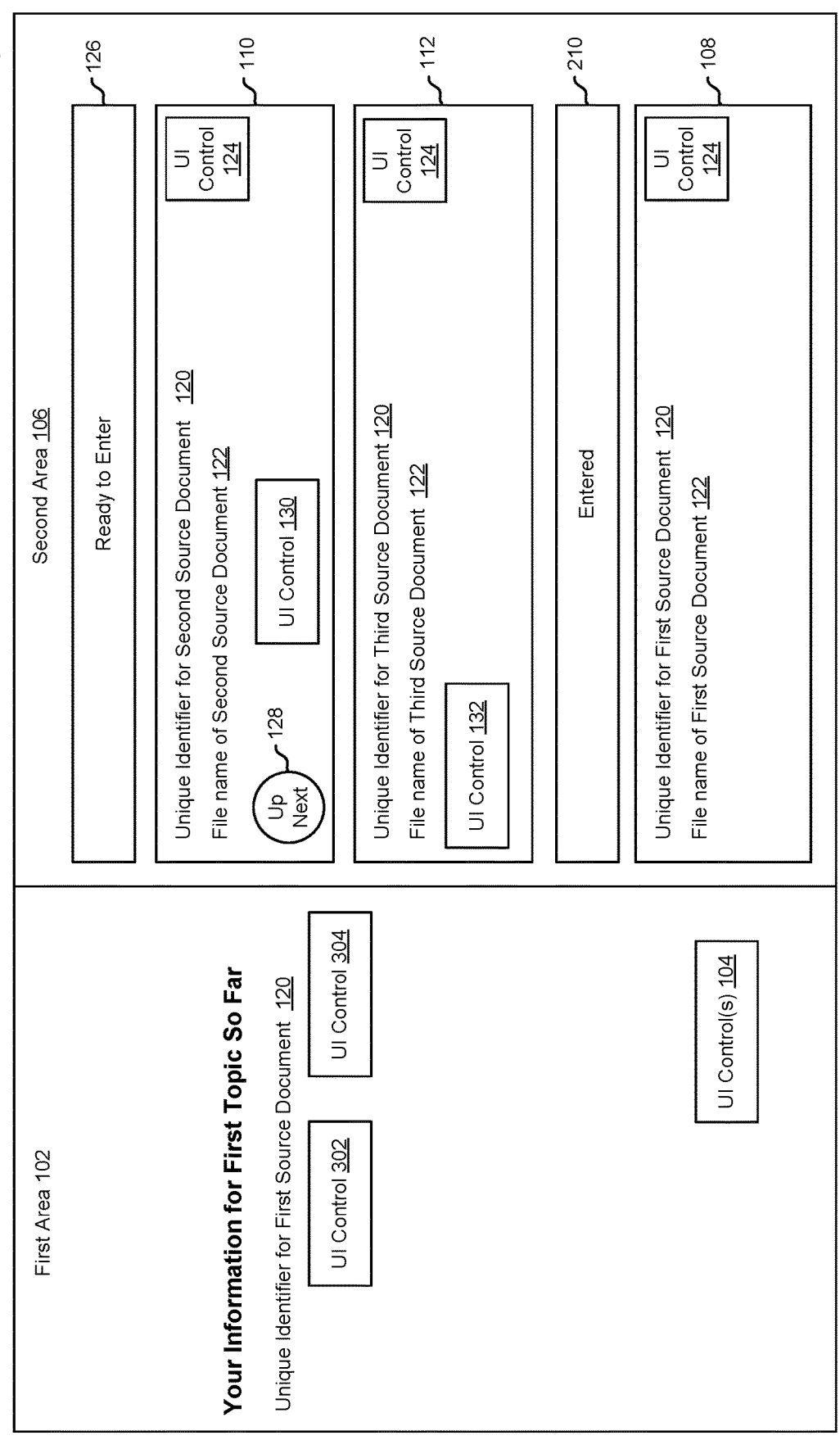
FIG. 3 depicts an example user interface screen related to automated entry of extracted data and verification of accuracy of the entered data according to some embodiments of the present disclosure
Figure 4:
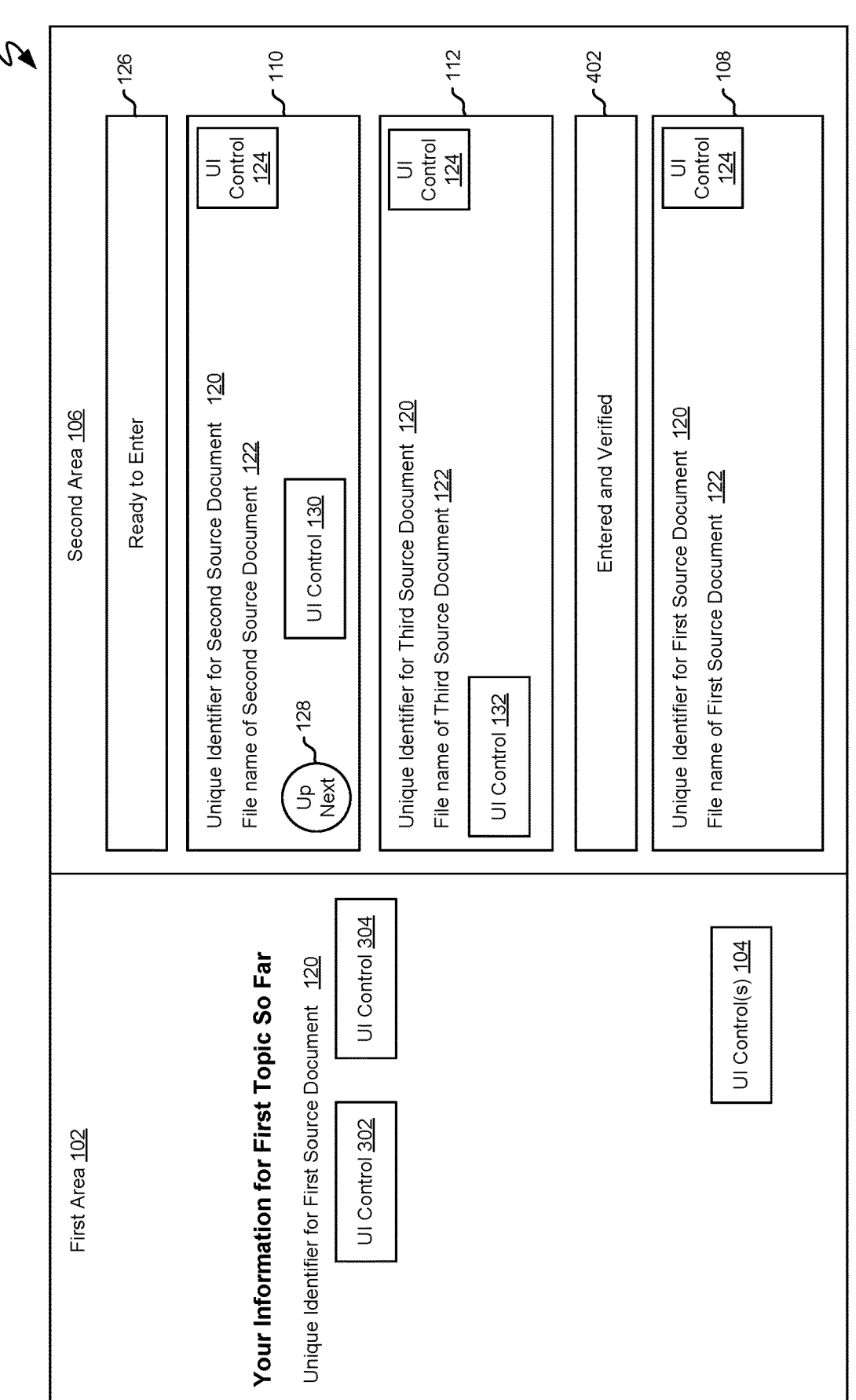
FIG. 4 depicts an example user interface screen related to automated entry of extracted data and verification of accuracy of the entered data according to some embodiments of the present disclosure

Example Graphical User Interfaces Depicting Updated Status for Entered Source Document FIG. 3 and FIG. 4 illustrate graphical user interfaces 300, 400 in which the second area 106 thereof is automatically updated to denote that the first source document is no longer included in the queue of source documents denoted by the first status identifier 126. For instance, automatically updating the second area 106 may include moving the first graphical object 108 from the first region of the second area 106 to denote that the first source document is no longer included in the queue. As shown in FIG. 3, automatically updating the second area 106 of the graphical user interface 300 may, in some embodiments, include moving the first graphical object 108 to a second region of the second area 106 of the graphical user interface 300 that includes the second status identifier 210 denoting one or more source documents whose extracted data has been entered into the document.

Alternatively, as shown in FIG. 4, automatically updating the second area 106 of the graphical user interface 300 may, in some embodiments, include moving the first graphical object 108 to a different region of the second area 106 of the graphical user interface 400 that includes a third status identifier 402 titled "Entered and Verified" if the user has taken the appropriate action to verify the accuracy of the auto populated data fields 202 for the first topic of the document.

For instance, the appropriate action may, as discussed above, include the user selecting (e.g., clicking) the third UI control 222 (FIG. 2) of the first graphical object 108 to access (e.g., open) the first source document in a window or tab that is separate from the window or tab in which the graphical user interface 200 (FIG. 2) is displayed. The appropriate action may further include the user confirming the auto populated data fields 202 for the first topic of the document matches information included in the first source document that becomes the extracted data. For instance, in some embodiments, the appropriate action may include the user updating a status identifier in a drop-down menu within the window or tab displaying the first source document from the first status identifier (e.g., Entered) to the second status identifier (e.g., Entered and Verified) to cause the software application to move the first graphical object 108 to a region within the second area 106 of the graphical user interface 400 that is associated with the third status identifier 402 titled "Entered and Verified" as shown in FIG. 4. Alternatively, the user updating the identifier in the drop-down menu from the first status identifier to the second status identifier may cause the software application to modify the second status identifier 210. More specifically, the software application may modify the text of the second status identifier 210 to read "Entered and Verified" to denote that the extracted data from the first source document has been entered into the document and verified by the user.

As shown, the first area 102 of the graphical user interface 300, 400 may be updated to reflect that the first topic of the document being prepared via the software application has been auto populated with extracted data from the first source document. For instance, the first area 102 of the graphical user interface 300, 400 may list the unique identifier 120 for the first source document under a heading titled "Your Information for First Topic so far." Furthermore, in some embodiments, the first area 102 of the graphical user interface 300, 400 may include a first UI control 302 to allow the user to perform a first action on the document being prepared via the software application and a second UI control 304 to allow the user to perform a second action on the document being prepared via the software application. For instance, the first UI control 302 may, when selected (e.g., clicked) by the user, allow the user to edit one or more of the data fields 202 (FIG. 2) auto populated with extracted data from the first source document. In this manner, the user may edit the data fields if the user discovers one or more of the fields was auto populated with incorrect or incomplete data from the first source document. Alternatively, or additionally, the second UI control 304 may allow the user to reset the data fields 202 of the first topic of the document so that the data fields 202 are no longer auto populated with extracted data from the first source document.

The graphical user interfaces 100, 200, 300, 400 discussed above with reference to FIGS. 1-4 improves the accuracy of the document (e.g., tax return) being prepared via the software application (e.g., tax preparation software) since the document, specifically the data fields thereof, is auto populated with the extracted data from the plurality of different source documents instead of being manually entered by the user which, as discussed above, may result in the document having one or more errors due, at least in part, to the user incorrectly entering data from one or more of the source documents (e.g., W-2s). Furthermore, the status identifiers (e.g., first status identifier 126, second status identifier 210, third status identifier 402) that indicate the status (e.g., Ready to Enter, Entered, Entered and Verified) of each of the different source documents provides the user a snapshot of the current status for each of the different source documents. Still further, computing resources are utilized more efficiently since the first area 102 depicting the document being auto populated with extracted data from the different source documents and the second area 106 depicting the status of each of the different source documents are displayed within the same tab or window. As such, embodiments of the present disclosure improve the functioning of a computing application by providing an improved graphical user interface that allows a user to more efficiently access, modify, and/or verify relevant information within the software application, and improve the functioning of computing devices involved by making better use of available screen space and avoiding processing and memory resources that would otherwise be utilized in connection with inefficient use of the software application (e.g., if the user had to inefficiently navigate between different pages in order to manage an automated import of data from multiple sources, as in conventional software applications).

Example Operations for Auto Populating One or More Data Fields of Document with Extracted Data from One or More Source Documents and Verifying Accuracy of Auto Population FIG. 5 depicts example operations 500 related to graphical user interfaces for verifying automated entry of extracted data from a plurality of different sources into a document being prepared with a software application. For example, operations 500 may be performed by one or more components of a computing system, such as system 600 of FIG. 6, described below.

Operation 502 may include displaying a graphical user interface associated with a software application configured to prepare a document based, at least in part, on extracted data from a plurality of different source documents. The graphical user interface may include a first area (such as the first area 102 in FIG. 1) displaying data (e.g., text, data fields, etc.) associated with the document. The graphical user interface may further include a second area (such as the second area 106 in FIG. 1) displaying a queue including at least a first graphical object (such as the first graphical object 108 in FIG. 1) descriptive of a first source document of the plurality of different source documents.

Operation 504 may include automatically populating one or more data fields of the document with the extracted data from the first source document. For instance, one or more data fields of the document being prepared by the software application may be auto populated with the extracted data from the first source document. In this manner, the extracted data from the first source document may be entered into the document without needing to be manually entered by a user which, as mentioned above, can result in errors affecting the accuracy of the document being prepared via the software application.

Operation 506 may include automatically updating the second area of the graphical user interface in response to Operation 504. For instance, in some embodiments, automatically updating the second area of the graphical user interface may include moving the first graphical object from a first region within the second area of the graphical user interface to a second region within the second area of the graphical user interface. For instance, the first region may be associated with a first status identifier (such as the first status identifier 126 in FIG. 3 and FIG. 4) denoting the queue of source documents, whereas the second region may be associated with a second status identifier (such as 210 in FIG. 3) that denotes one or more source documents whose extracted data has been entered into the document.

In certain embodiments, operations may include receiving user-input indicating a user has verified the accuracy of the one more data fields auto populated with the extracted data from the first source document. More specifically, the user-input may include data indicating a status identifier included in the first source document has been changed from a first status identifier indicative of the extracted data from the first source document being entered into the document but not verified by the user to a second status identifier indicative of the extracted data from the first source document being entered and verified by the user.

In certain embodiments, operations may, in response to receiving the user-input indicating a user has verified the accuracy of the one or more data fields auto populated with the extracted data, include modifying the second status identifier associated with the second region of the second area of the graphical user interface to denote that the graphical objects included in the second region are entered and verified by the user. In alternative embodiments in which the second region includes at least one graphical object for a source document whose extracted data has been entered into the document but has yet to be manually verified by the user for accuracy, the operations may include moving the first graphical object from a second region within the graphical user interface to a third region within the graphical user interface that is associated with a third identifier denoting source documents that have been entered and verified by the user.

Example Computing System

Figure 6:
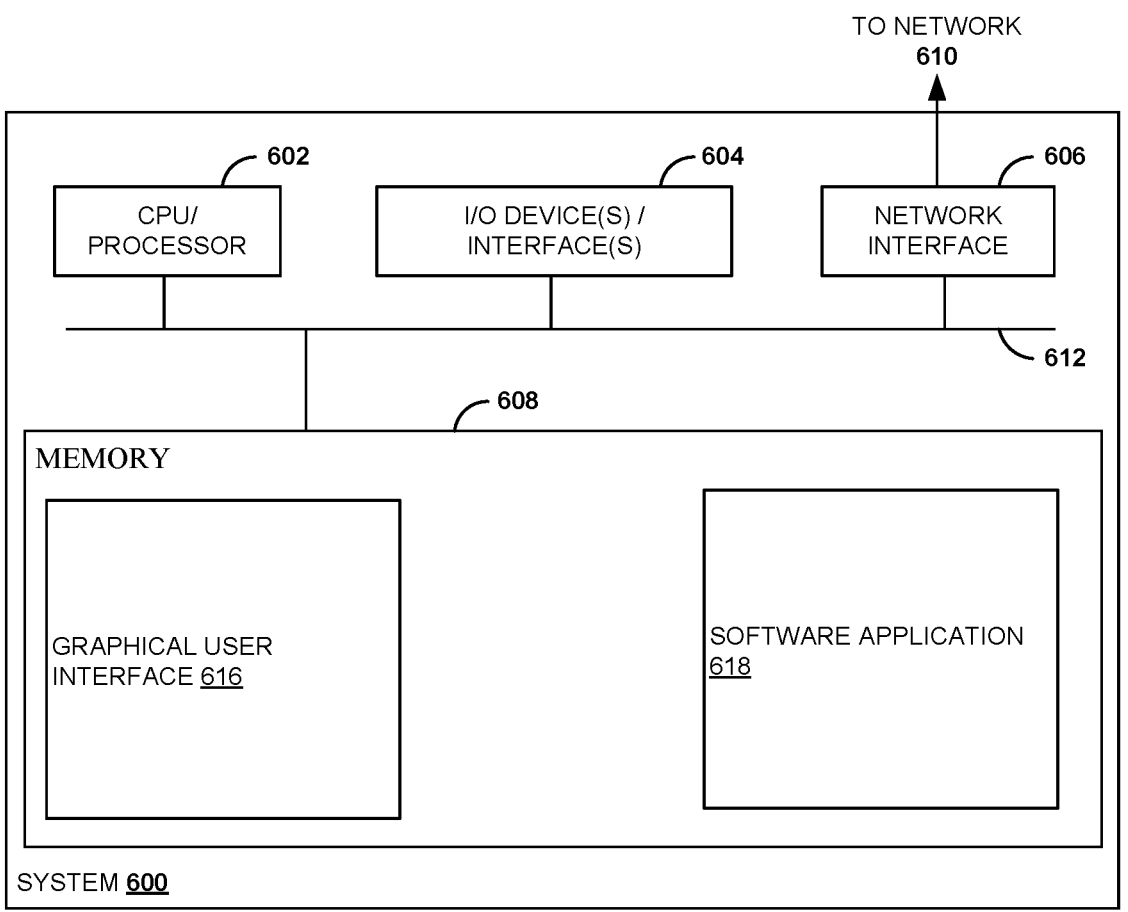
FIG. 6 depicts an example processing system for automated entry of extracted data and verification of accuracy of the entered data according to some embodiments of the present disclosure.

FIG. 6 illustrates an example system 600 with which embodiments of the present disclosure may be implemented. For example, the system 600 may be configured to perform the operations 500 of FIG. 5.

The system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, and an interconnect 612. It is contemplated that one or more components of the system 600 may be located remotely and accessed via a network. It is further contemplated that one or more components of the system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, and the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

The memory 608 includes a graphical user interface 616, which may be a graphical user interface of a software application (e.g., application 618), such as corresponding to graphical user interfaces 100, 200, 300, and 400 of FIGS. 1-4. While shown separately, the graphical user interface 616 may be part of the application 618.

In some embodiments, the memory 608 may include the application 618, which generally represent a software application that includes a graphical user interface that allows a user to auto populate a document being prepared with the software application with extracted data from different source documents and verify the accuracy of the auto populated document against the source documents.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:

displaying, by one or more processors, a graphical user interface associated with a software application configured to prepare a document based, at least in part, on extracted data from one or more of a plurality of different source documents, the graphical user interface including a screen having a first area displaying data associated with the document, the screen further including a second area displaying a queue including at least a first graphical object descriptive of a first source document of the plurality of different source documents, the first graphical object including a first user interface control associated with opening the first source document in a window that is different from a window displaying the screen of the graphical user interface;

automatically populating, by the one or more processors, one or more data fields of the document that are displayed within the first area of the screen with the extracted data from the first source document;

in response to the automatically populating, moving, by the one or more processors, the first graphical object including the first user interface control from a first region within the second area of the screen to a second region within the second area of the screen, the first region associated with a first status identifier that denotes the queue, the second region associated with a second status identifier that separates the second region from the first region and denotes the extracted data from the first source document has been entered into the document;

receiving, by the one or more processors, user-input indicating a user has verified accuracy of the one or more data fields that were automatically populated with the extracted data from the first source document, wherein the user-input comprises user-selection of the first user interface control to cause the first source document to be displayed in the window that is separate from the window displaying the screen of the graphical user interface, and wherein the user-input further comprises updating a status identifier for the first source document within the window displaying the first source document to indicate that the extracted data from the first source document that was entered into the document has been verified by the user; and in response to the receiving, moving, by the one or more processors, the first graphical object from the second region within the second area of the screen to a third region within the second area of the screen, the third region associated with a third status identifier that separates the third region from the second region and denotes the extracted data from the first source document has been entered into the document and verified by the user.

2. The method of claim 1, wherein the first graphical object further includes a second user interface control configured to remove the first graphical object from the queue.

3. The method of claim 2, wherein the first graphical object further comprises: (i) a unique identifier for the first source document; or (ii) a file name of the first source document.

4. The method of claim 1, further comprising:

receiving, by the one or more processors and via a user interface control included in the first area of the screen, user-input indicating the document is ready to be auto populated with the extracted data from the first source document.

5. The method of claim 1, wherein:

the document comprises a financial document including a plurality of different topics; and the first source document is associated with a first topic of the document.

6. A system comprising:

one or more processors; and a memory comprising instructions that, when executed by the one or more processors, cause the system to:

display a graphical user interface associated with a software application configured to prepare a document based, at least in part, on extracted data from one or more of a plurality of different source documents, the graphical user interface including a screen having a first area displaying data associated with the document, the screen further including a second area displaying a queue including at least a first graphical object descriptive of a first source document of the plurality of different source documents, the first graphical object including a first user interface control associated with opening the first source document in a window that is separate from a window displaying the screen of the graphical user interface;

automatically populate one or more data fields of the document that are displayed within the first area of the screen with the extracted data from the first source document;

in response to automatically populating the one or more data fields, move the first graphical object including the first user interface control from a first region within the second area of the screen to a second region within the second area of the screen, the first region associated with a first status identifier that denotes the queue, the second region associated with a second status identifier that separates the second region from the first region and denotes the extracted data from the first source document has been entered into the document;

receive user-input indicating a user has verified accuracy of the one or more data fields that were automatically populated with the extracted data from the first source document, wherein the user-input comprises user-selection of the first user interface control to cause the first source document to be displayed in the window that is separate from the window displaying the screen of the graphical user interface, and wherein the user-input further comprises updating a status identifier for the first source document within the window displaying the first source document to indicate that the extracted data from the first source document that was entered into the document has been verified by the user; and in response to receiving the user-input, move the first graphical object from the second region within the second area of the screen to a third region within the second area of the screen, the third region associated with a third status identifier that separates the third region from the second region and denotes the extracted data from the first source document has been entered into the document and verified by the user.

7. The system of claim 6, wherein the first graphical object further includes a second user interface control configured to remove the first graphical object from the queue.

8. The system of claim 7, wherein the first graphical object further comprises:

(i) a unique identifier for the first source document; or (ii) a file name of the first source document.

9. The system of claim 6, wherein the instructions further cause the system to:

receive, via a user interface control included in the first area of the screen, user-input indicating the document is ready to be auto populated with the extracted data from the first source document.

10. The system of claim 6, wherein:

the document comprises a financial document including a plurality of different topics; and the first source document is associated with a first topic of the document.

11. A non-transitory computer-readable medium comprising instructions that, when executed by one or more processors of a computing system, cause the computing system to:

display a graphical user interface associated with a software application configured to prepare a document based, at least in part, on extracted data from one or more of a plurality of different source documents, the graphical user interface including a screen having a first area displaying data associated with the document, the screen further including a second area displaying a queue including at least a first graphical object descriptive of a first source document of the plurality of different source documents, the first graphical object including a first user interface control associated with opening the first source document in a window that is separate from a window displaying the screen of the graphical user interface;

automatically populate one or more data fields of the document that are displayed within the first area of the screen with the extracted data from the first source document; and in response to automatically populating the one or more data fields, move the first graphical object including the first user interface control from a first region within the second area of the screen to a second region within the second area of the screen, the first region associated with a first status identifier that denotes the queue, the second region associated with a second status identifier that separates the second region from the first region and denotes the extracted data from the first source document has been entered into the document;

receive user-input indicating a user has verified accuracy of the one or more data fields that were automatically populated with the extracted data from the first source document, wherein the user-input comprises user-selection of the first user interface control to cause the first source document to be displayed in the window that is separate from the window displaying the screen of the graphical user interface, and wherein the user-input further comprises updating a status identifier for the first source document within the window displaying the first source document to indicate that the extracted data from the first source document that was entered into the document has been verified by the user; and in response to receiving the user-input, move the first graphical object from the second region within the second area of the screen to a third region within the second area of the screen, the third region associated with a third status identifier that separates the third region from the second region and denotes the extracted data from the first source document has been entered into the document and verified by the user.

\* \* \* \* \*